(12) United States Patent
Kim et al.

(10) Patent No.: US 7,275,865 B2
(45) Date of Patent: Oct. 2, 2007

(54) TEMPERATURE MEASURING APPARATUS USING CHANGE OF MAGNETIC FIELD

(75) Inventors: Tae-gyu Kim, Hwaseong-si (KR); Seong-gu Kim, Pyeonglaek-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 154 days.

(21) Appl. No.: 11/167,093

(22) Filed: Jun. 28, 2005

(65) Prior Publication Data

US 2005/0286607 A1 Dec. 29, 2005

(30) Foreign Application Priority Data

Jun. 28, 2004 (JP) .................... 10-2004-0048934

(51) Int. Cl.
 *G01R 33/02* (2006.01)
 *G01K 7/00* (2006.01)
(52) U.S. Cl. .................. 374/163; 374/141; 374/120; 118/725; 324/263
(58) Field of Classification Search ................ 374/163, 374/120, 141, 183, 184; 324/251, 252, 207.21, 324/224, 765, 260–263
See application file for complete search history.

(56) References Cited

U.S. PATENT DOCUMENTS

| | | | | |
|---|---|---|---|---|
| 5,354,130 A | * | 10/1994 | Seppa et al. ................ 374/175 |
| 5,462,603 A | * | 10/1995 | Murakami .................. 118/719 |
| 5,466,614 A | * | 11/1995 | Yakura et al. ................ 438/14 |
| 6,064,220 A | * | 5/2000 | Sugasawara et al. ........ 324/765 |
| 6,150,809 A | * | 11/2000 | Tiernan et al. .............. 324/238 |
| 6,160,242 A | * | 12/2000 | Guardado ................... 219/390 |
| 6,462,538 B2 | * | 10/2002 | Harada ........................ 324/224 |
| 6,503,364 B1 | * | 1/2003 | Masuda et al. ......... 156/345.24 |
| 6,671,232 B1 | * | 12/2003 | Stupp ....................... 369/13.02 |
| 6,794,886 B1 | * | 9/2004 | Chen et al. ................. 324/716 |
| 6,864,108 B1 | * | 3/2005 | Papa Rao et al. ............. 438/14 |
| 7,053,607 B2 | * | 5/2006 | Sato ........................... 324/224 |
| 2002/0153882 A1 | * | 10/2002 | Grimes et al. .............. 324/209 |
| 2003/0186519 A1 | * | 10/2003 | Downey et al. ............. 438/530 |
| 2004/0154747 A1 | * | 8/2004 | Ni et al. ................. 156/345.48 |
| 2005/0185346 A1 | * | 8/2005 | Shoji ......................... 360/324.1 |
| 2006/0291106 A1 | * | 12/2006 | Shoji ....................... 360/324.11 |

* cited by examiner

*Primary Examiner*—Gail Verbitsky
(74) *Attorney, Agent, or Firm*—Sughrue Mion, PLLC

(57) ABSTRACT

A temperature measuring apparatus measures the temperature of a wafer in real time using a change of magnetic field during a thermal process. The temperature measuring apparatus includes: at least one conductive structure disposed on one surface of the wafer, in which an electrical conductivity of the conductive structure varies depending on temperature; a magnetic field generator installed facing the conductive structure with respect to a center of the wafer; and a magnetic field measuring sensor installed above the conductive structure.

18 Claims, 11 Drawing Sheets

TEMPERATURE MEASURING APPARATUS USING CHANGE OF MAGNETIC FIELD

BACKGROUND OF THE INVENTION

This application claims priority from Korean Patent Application No. 10-2004-0048934, filed on Jun. 28, 2004, in the Korean Intellectual Property Office, the disclosure of which is incorporated herein in its entirety by reference.

1. Field of the Invention

Apparatuses consistent with the present invention relate to measuring temperature using a change of magnetic field, and more particularly, to measuring temperature of a wafer in real time using a change of magnetic field at a wafer thermal processing system.

2. Description of the Related Art

Photolithography is a process used to pattern semiconductor materials stacked on a wafer. During photolithography, a thermal process is performed three times. A first thermal process is a soft bake which is performed after coating a photoresist on an entire surface of the wafer. The soft bake is performed so as to maintain uniformity of the photoresist coated on the wafer. The soft bake removes solvent from the photoresist by heating the wafer on a hot plate at 80-110° C. After the soft bake, the wafer is exposed to ultraviolet rays using a projection exposure system or the like and predetermined patterns are formed on the photoresist. After the exposure, a post exposure bake (PEB) is performed as a second thermal process. The PEB is performed so as to prevent unnecessary exposure at an exposure boundary due to scattering of ultraviolet rays. In the PEB, the wafer is baked on a hot plate at about 150° C. After the exposure, developer solution is sprayed onto the wafer, and a region onto which light is incident, or a region onto which no light is incident, is removed due to a chemical reaction. After development, a hard bake is performed as a third thermal process. The hard bake removes solvent from the photoresist and hardens the photoresist by heating the wafer on a hot plate at about 150° C.

In these thermal processes, temperature distribution and temperature uniformity across the wafer are important processing variables which have the greatest influence on quality and dispersion of line width in a semiconductor circuit. Even a slight error in temperature changes solubility of the photoresist. As a result, line widths of patterns become different. In order to obtain good quality, temperature variation must be restricted to ±0.1° C. over the entire wafer heated on the hot plate. Therefore, it is necessary to measure the wafer temperature during the thermal process to determine whether the wafer is being heated uniformly.

Conventional methods for measuring wafer temperature include a contact temperature measuring method and a non-contact temperature measuring method.

Figure 1A:
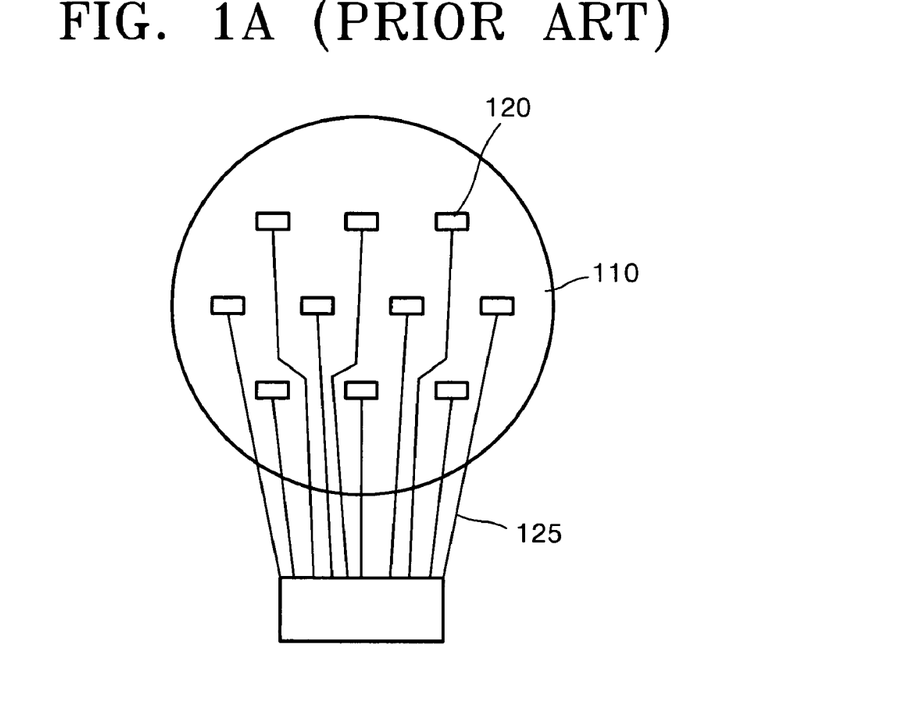
FIGS. 1A and 1B schematically illustrate a conventional contact temperature measuring method.
Figure 1B:
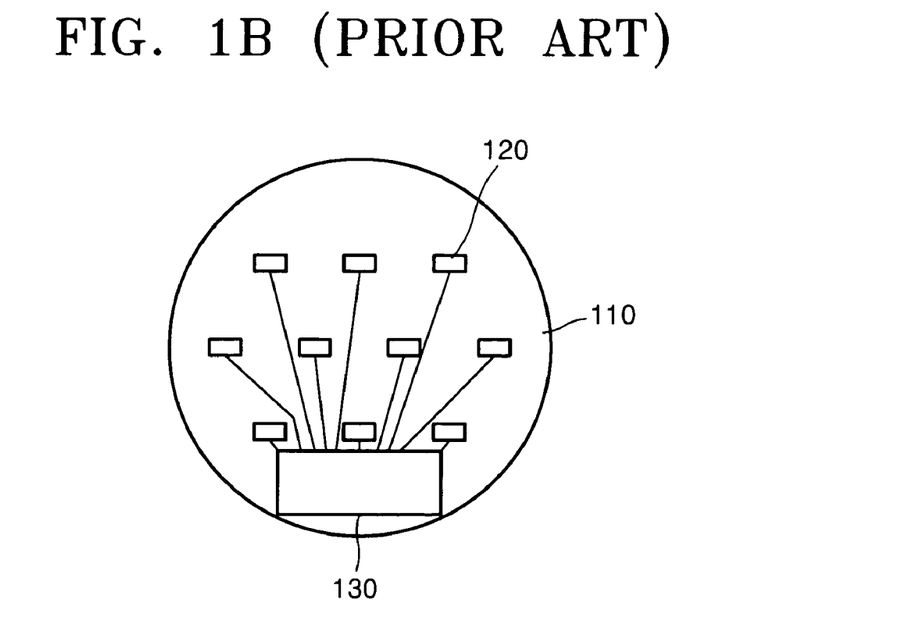

According to the contact temperature measuring method, before the thermal process is actually performed on the wafer, whether the wafer is uniformly heated is examined by heating a sensor wafer on the hot plate. FIGS. 1A and 1B are views of the sensor wafer. Referring to FIG. 1A, a plurality of temperature sensors 120 are installed on a sensor wafer 110 and a change of temperature on the sensor wafer 110 is measured through wires 125 connected to the temperature sensors 120. Referring to FIG. 1B, instead of connecting the wires complexly, a plurality of temperature sensors 120 and a memory 130 are installed on the sensor wafer 110 and a change of temperature on the sensor wafer 110 is written to the memory 130. The contact temperature sensor used herein includes a resistance thermal detector (RTD) which detects electrical resistance, a thermocouple (TC) which detects thermo-electromotive force, a metal or glass thermometer which detects thermal expansion, an integrated circuit (IC) temperature sensor which operates based on a temperature characteristic of a silicon transistor, and so on. Through these methods, a heating condition of the hot plate is adjusted until the temperatures measured by the temperature sensors become uniform. After it is checked that the entire area of the sensor wafer is uniformly heated, the wafer is actually loaded and the thermal process is performed thereon.

According to this conventional contact temperature measuring method, the temperature sensors must directly contact the wafer. However, it is difficult to correctly contact the temperature sensors with the object to be measured. Also, the conventional contact temperature measuring method is used to set an appropriate heating condition using the sensor wafer in advance, not while the thermal process is actually being performed. Therefore, it is impossible to measure the actual wafer temperature while the thermal process is being performed. That is, the conventional method does not facilitate measurement of the wafer temperature in real time during the thermal process. When an external environment changes during the thermal process, it is impossible to promptly cope with the change. As a result, the proportion of defective areas may increase during the thermal process. Also, when a defect occurs during a complex semiconductor manufacturing process, it is impossible to examine and reliably determine which process caused the defect. In order to make such a determination, the process must be stopped to measure the temperature using the sensor wafer. Thus, the semiconductor manufacturing process is delayed and manufacturing cost is increased.

Figure 2:
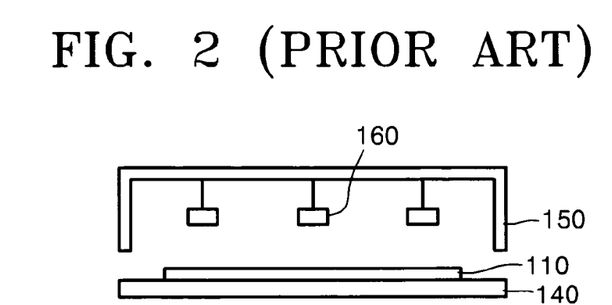
FIG. 2 schematically illustrates a conventional non-contact temperature measuring method.

In order to solve these problems, a non-contact temperature measuring method has been proposed. The non-contact temperature measuring method measures the wafer temperature in real time during the thermal process and obtains temperature history information which contains a change of temperature with respect to time during the thermal process. The non-contact temperature measuring method makes use of a principle of black body radiation. That is, the temperature is measured by detecting infrared rays radiated from the heated object. FIG. 2 is a sectional view illustrating the non-contact temperature measuring method. Referring to FIG. 2, while a wafer 110 is heated on a hot plate 140, a temperature of the wafer 110 is measured in real time using a plurality of temperature sensors 160 which are installed below a cap 150 of a thermal processing system. An infrared thermometer is widely used as the temperature sensor 160. The infrared thermometer includes a quantum infrared sensor which measures an internal photoelectric effect of semiconductor material, a thermal infrared sensor which measures change in a material constant with respect to temperature, and so on. Also, the thermal infrared sensor includes a pyroelectric infrared sensor which operates based on the pyroelectric effect in which electricity is generated in ferroelectric material bombarded by infrared radiation.

However, the conventional non-contact temperature measuring method has problems in that radiation generated from the object to be measured must sufficiently reach the sensor and an effective emissivity of the object to be measured must be accurately known, or its reproduction must be possible. Also, the infrared sensor used in the non-contact temperature measuring method has a relatively high accuracy at high temperatures (generally, higher than 1000° C.), but has a relatively low accuracy at the low temperatures (hundreds of ° C.) at which the thermal process is preformed. Further, as described above, temperature variation must within ±0.1° C. over the entire wafer. However, since resolution of the infrared sensor is about 1° C., use of the infrared sensor is inappropriate during the thermal process.

SUMMARY OF THE INVENTION

The present invention provides a temperature measuring apparatus which is capable of correctly measuring a temperature distribution of wafer in real time while a thermal process is being performed on the wafer.

According to an aspect of the present invention, there is provided a temperature measuring apparatus for measuring the temperature of wafer during a thermal process. The temperature measuring apparatus includes: at least one conductive structure disposed on one surface of the wafer, an electrical conductivity of the conductive structure varying with temperature; a magnetic field generator installed facing the conductive structure with respect to a center of the wafer; and a magnetic field measuring sensor installed above the conductive structure.

The temperature measuring apparatus may further include: an AC power source for supplying AC current to the magnetic field generator; a signal processor for calculating a temperature of the wafer from the strength of the magnetic field, the strength of the magnetic field being measured by the magnetic field measuring sensor; and a terminal for displaying the calculated temperature of the wafer. The AC power source may supply AC current to the magnetic field generators in sequence at predetermined time intervals and in a predetermined order.

The conductive structure may be an induction coil which is spirally wound at least one time.

According to another aspect of the present invention, there is provided a wafer thermal processing system which includes: a hot plate for uniformly heating a wafer placed thereon; a cover for sealing the hot plate; and a temperature measuring apparatus including: at least one conductive structure disposed on an upper surface of the wafer, an electrical conductivity of the conductive structure varying with temperature; a magnetic field generator installed facing the conductive structure with respect to a center of the wafer; and a magnetic field measuring sensor installed above the conductive structure.

The magnetic field generator may be installed within the hot plate and the magnetic field measuring sensor may be installed protruding downward from an inner surface of the cover.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 3A:
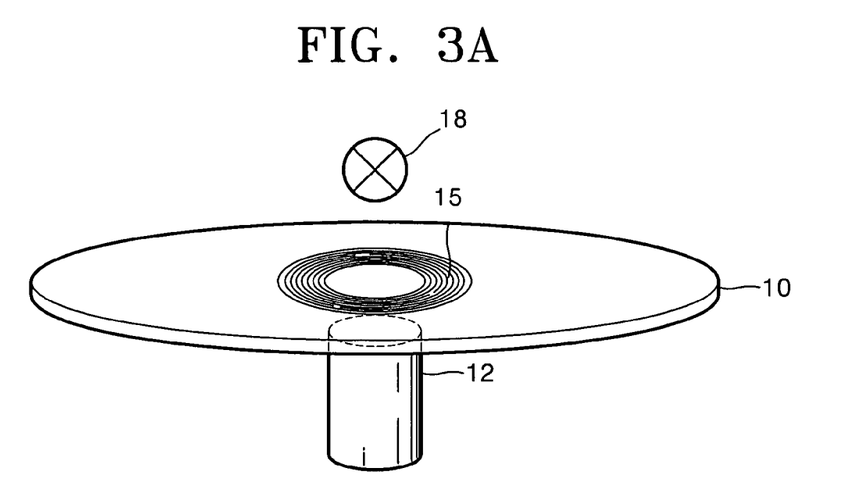
FIGS. 3A and 3B are views of a temperature measuring apparatus using a change of magnetic field according to an exemplary embodiment of the present invention.
Figure 3B:
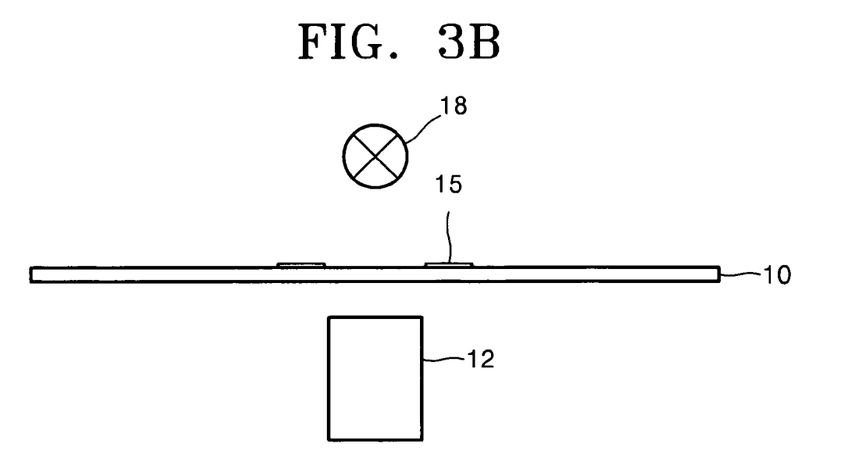

FIG. 3A is a perspective view of a temperature measuring apparatus using a change of magnetic field according to an exemplary embodiment of the present invention, and FIG. 3B is a sectional view of the temperature measuring apparatus shown in FIG. 3A. Referring to FIGS. 3A and 3B, a temperature measuring apparatus according to an exemplary embodiment of the present invention includes a conductive structure 15 disposed on one surface of a wafer 10, a magnetic field generator 12 installed facing the conductive structure 15, with the wafer 10 interposed therebetween, and a magnetic field measuring sensor 18 installed above the conductive structure 15.

The conductive structure 15 is provided for changing the magnetic field according to electromagnetic induction and may be an induction coil which is spirally wound at least one time. Generally, the conductive structure 15 has high electrical conductivity at room temperature. It may be preferable to use a material whose electrical conductivity depends heavily upon temperature. Also, the magnetic field generator 12 generates the magnetic field when a current is applied thereto, and may be an AC electromagnet driven by an AC power source.

Operation of the temperature measuring apparatus will now be described. When an AC voltage is applied to the magnetic field generator 12, such as an electromagnet, the magnetic field generator 12 generates a time-varying magnetic field. Then, according to Lenz's law and, Faraday's law of induction, the conductive structure 15 such as the induction coil generates an induced magnetic field in a direction opposing change in the magnetic field. That is, the induced magnetic field generated by the conductive structure 15 reduces the magnetic field generated by the magnetic field generator 12. Therefore, strength of the time-varying magnetic field is reduced by the conductive structure 15. At this point, the strength of the magnetic field induced by the conductive structure 15 is proportional to the electrical conductivity of the conductive structure 15.

Figure 4:
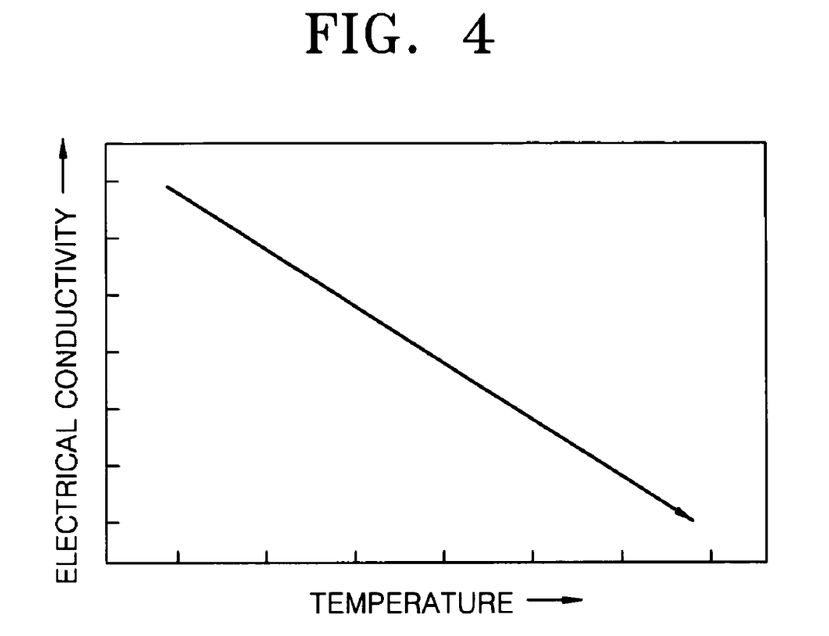
FIG. 4 is a graph illustrating the relation between electrical conductivity of a metal and temperature.

Meanwhile, in the case of highly conductive materials such as metal, the electrical conductivity decreases as temperature increases, as shown in FIG. 4.

Figure 5:
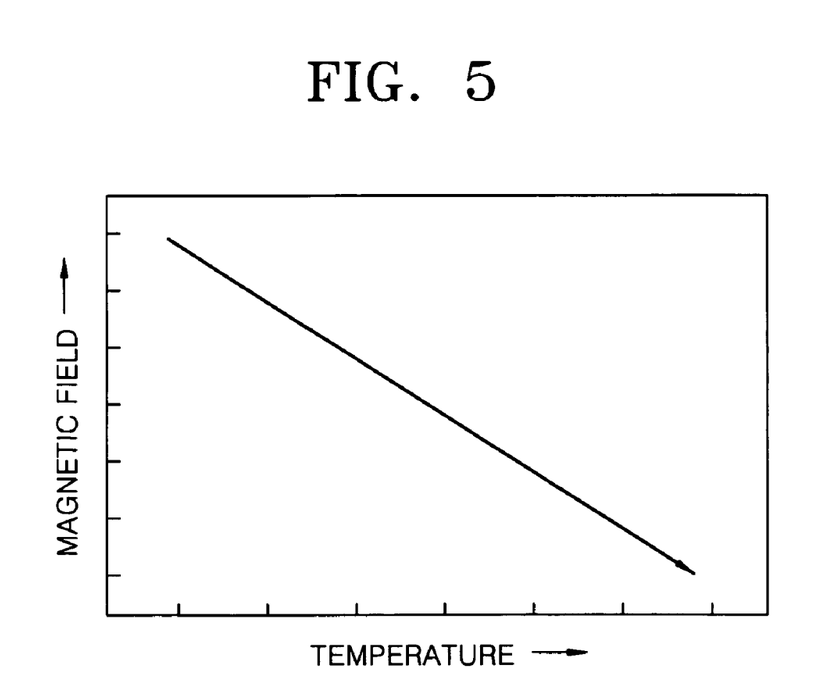
FIG. 5 is a graph illustrating the relation between an induced magnetic field of a conductive structure and temperature.

Referring to FIG. 5, when the conductive structure 15 is formed of metal, the strength of the induced magnetic field generated by the conductive structure 15 decreases as temperature increases, because the strength of the induced magnetic field is proportional to the electrical conductivity. As a result, as the temperature increases, the reduction of the magnetic field generated by the magnetic field generator 12 decreases. Thus, as the temperature increases, the strength of the net magnetic field measured by the magnetic field measuring sensor 18 increases.

Utilizing this principle, it is possible to measure the temperature of the wafer 10. That is, the temperature of the wafer 10 can be calculated by measuring the strength of the induced magnetic field generated by the conductive structure 15. Here, the strength of the induced magnetic field generated by the conductive structure 15 can be known using the difference between the strength of the magnetic field generated by the magnetic field generator 12 and the overall strength of the magnetic field measured by the magnetic field measuring sensor 18. Also, the strength of the magnetic field generated by the magnetic field generator 12 can be controlled by the magnitude and frequency of an AC voltage applied to the magnetic field generator 12. A large change in electrical conductivity with respect to temperature is advantageous as it increases the resolution of the temperature measuring apparatus.

Figure 6A:
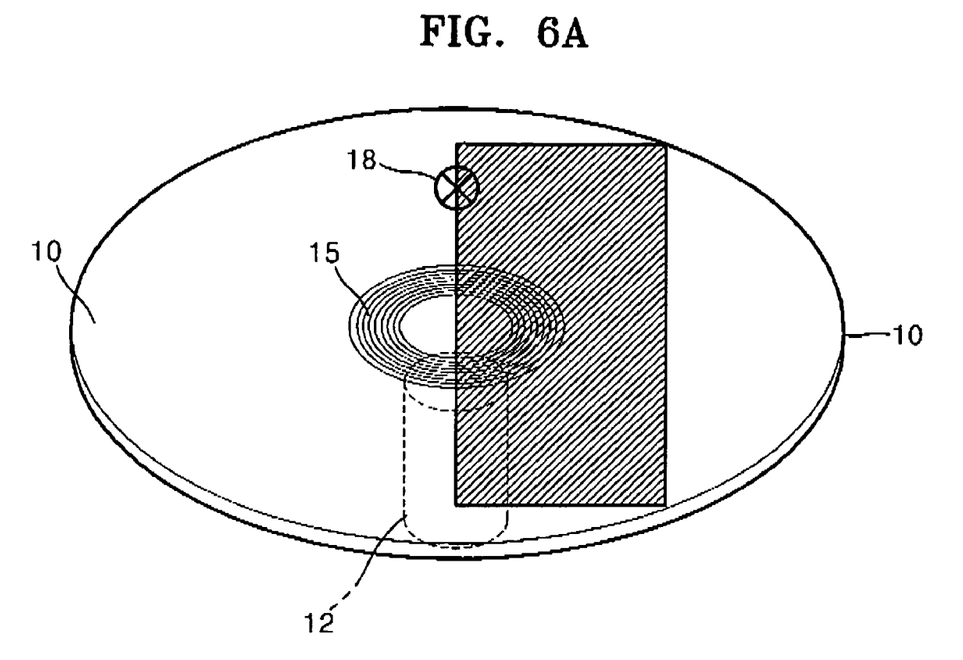
FIGS. 6A and 6B are views illustrating a temperature measuring apparatus for testing a change in a distribution of magnetic field due to a conductive structure.
Figure 6B:
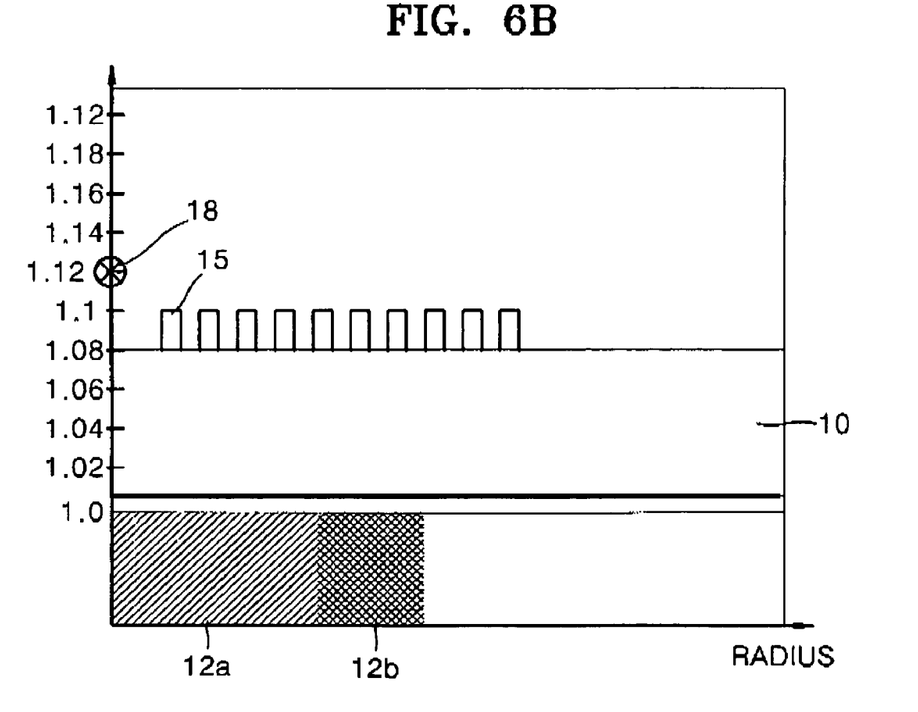
Figure 7A:
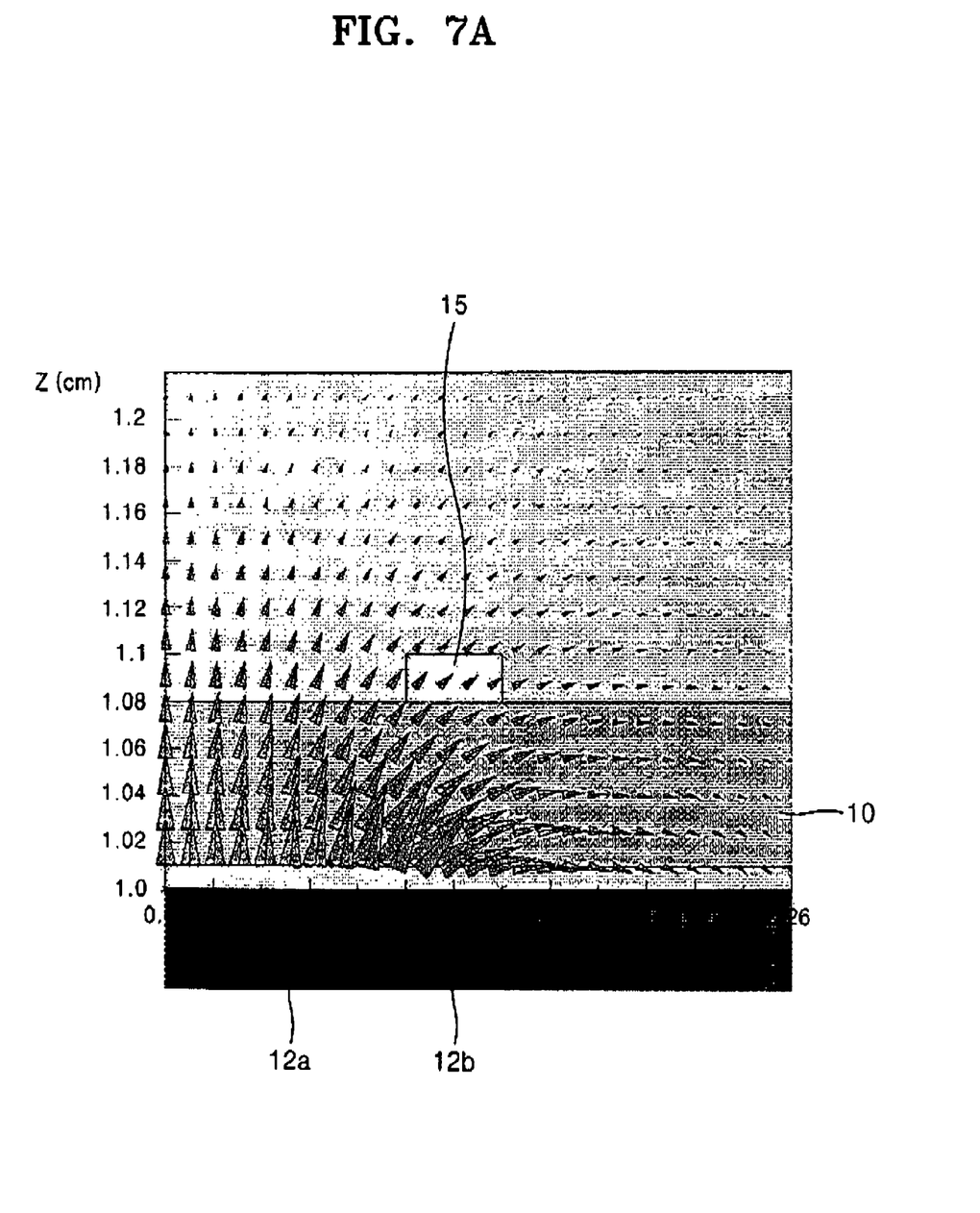
FIGS. 7A and 7B illustrate distributions of the magnetic field shown in FIGS. 6A and 6B, which are drawn with magnetic field vectors and equi-magnetic force lines.
Figure 7B:
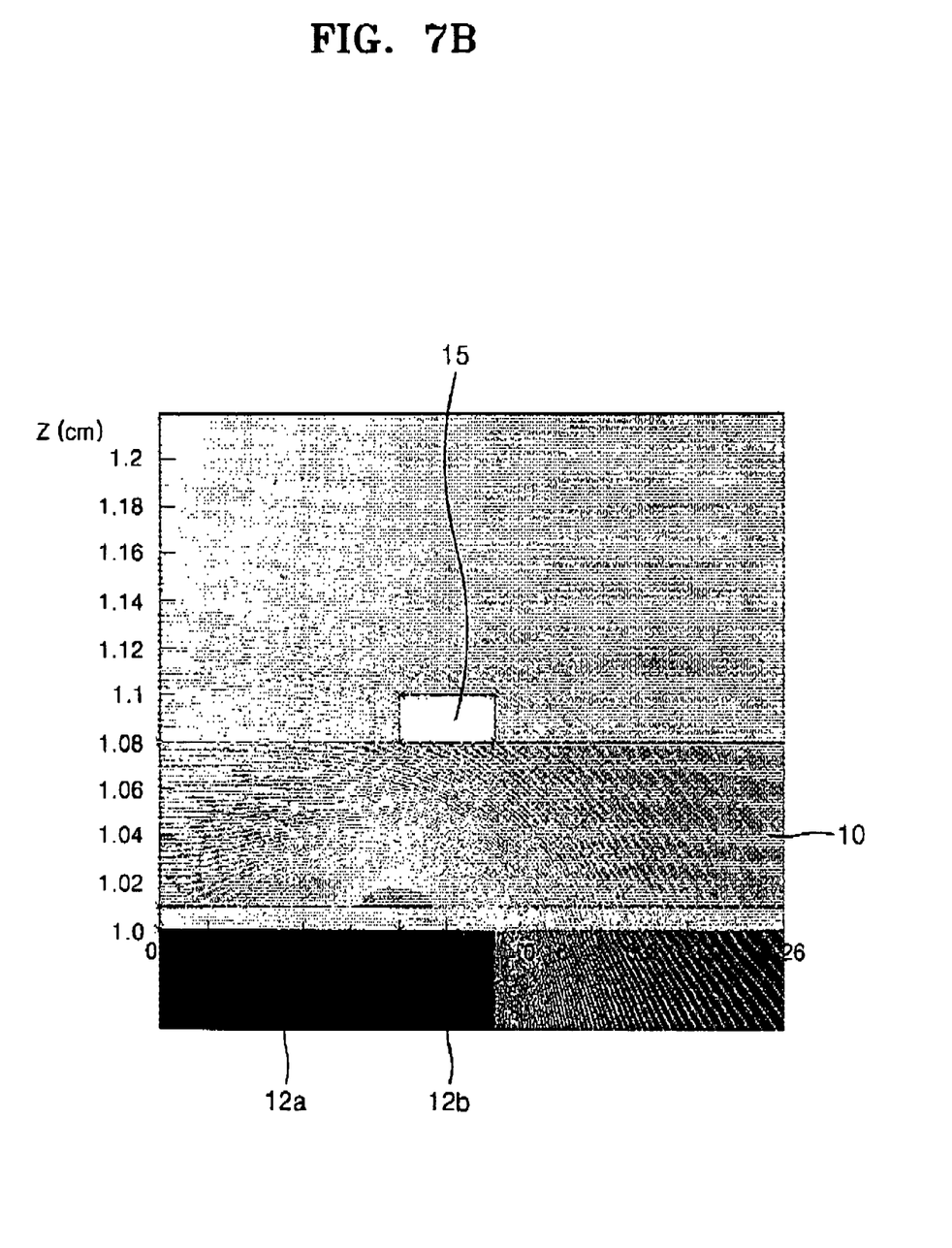

As shown in FIG. 6A, in order to check the distribution of the magnetic field due to the magnetic field generator 12 and the conductive structure 15, the conductive structure 15 having at least one turn is arranged at the center of the wafer 10 and the magnetic field generator 12 is arranged below the wafer 10. FIG. 6B is a sectional view of a rectangular box shown in FIG. 6A. In FIG. 6B, a reference numeral 12a represents a core of the magnetic field generator 12 and a reference numeral 12b represents a coil of the magnetic field generator 12. FIGS. 7A and 7B show simulation results illustrating the distribution of the magnetic field and are drawn with magnetic field vectors and equi-magnetic force lines when the conductive structure has one turn. Referring to FIGS. 7A and 7B, the strength of the magnetic field generated by the magnetic field generator 12 is greatly reduced due to the presence of the conductive structure 15.

The resolution of the temperature measuring apparatus is proportional to the induced magnetic field generated by the conductive structure 15, as well as variation in the electrical conductivity of the conductive structure with respect to temperature. That is, the greater the magnitude of the induced magnetic field, the better the resolution of the temperature measuring apparatus. The reason for this is that an absolute variation width of the induced magnetic field with respect to temperature increases with the strength of the induced magnetic field. Generally, the strength of the induced magnetic field is dependent upon the number of turns of the coil, electrical conductivity, variation of the magnetic field, and so on.

Figure 8:
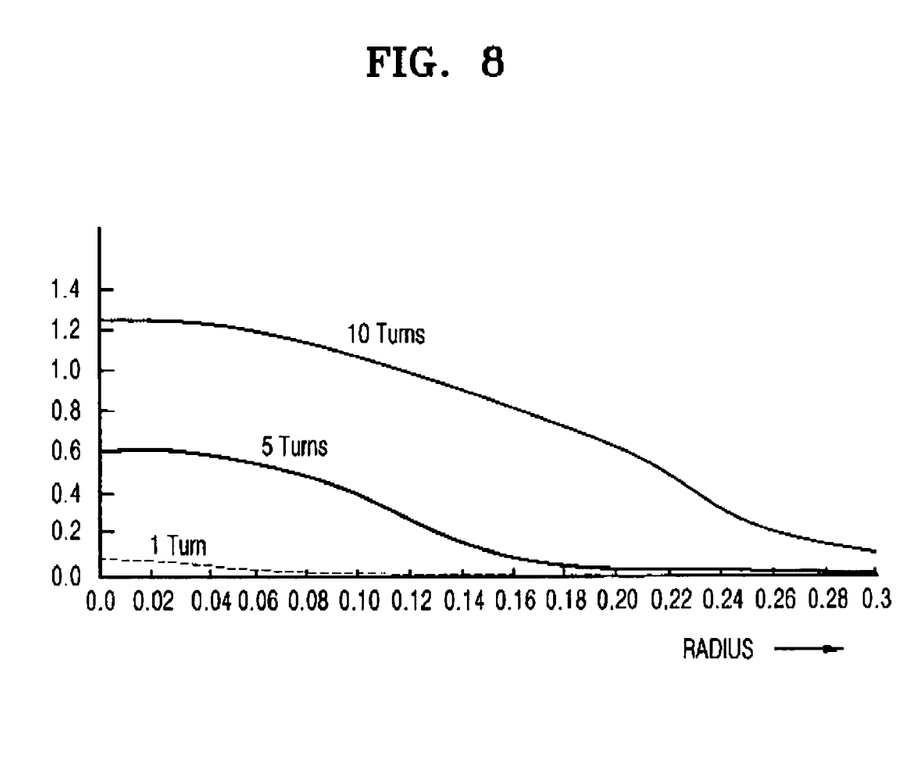
FIG. 8 is a graph illustrating strength of the induced magnetic field versus turns of the conductive structure.

FIG. 8 is a graph illustrating the strength of the induced magnetic field with respect to the turns of the conductive structure 15 formed in the shape of a planar induction coil. Referring to FIG. 8, when the number of turns is one, five, and ten, the strength of the induced magnetic field generated by the conductive structure 15 gradually increases. Therefore, the variation in the magnetic field with respect to temperature can be amplified by increasing the number of turns of the coil.

Figure 9:
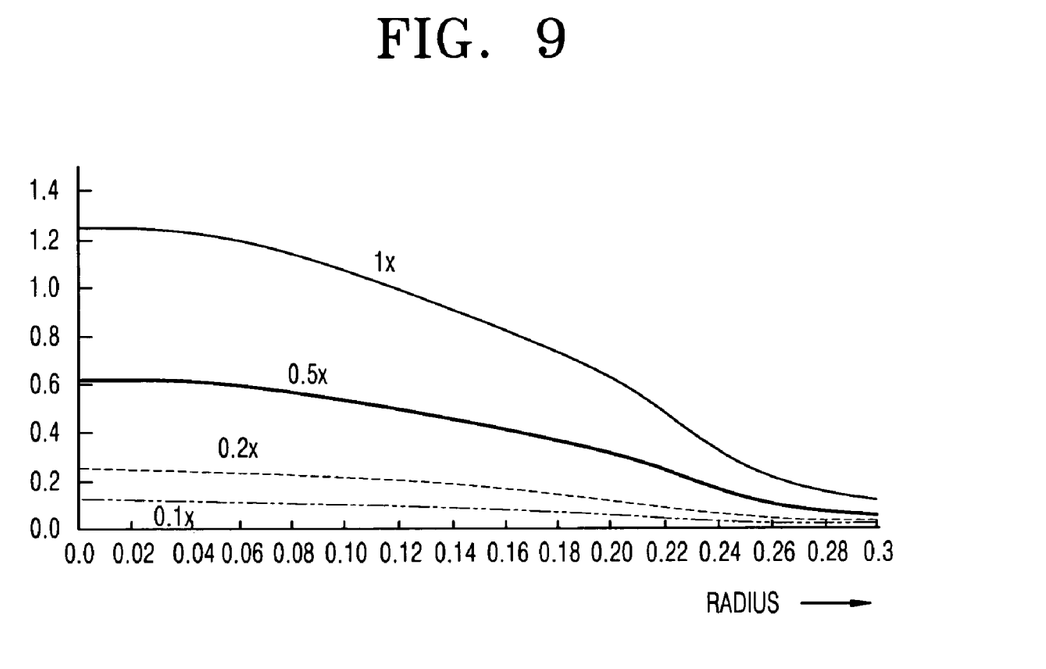
FIG. 9 is a graph illustrating strength of the induced magnetic field versus electrical conductivity of the conductive structure.

FIG. 9 is a graph illustrating the strength of the induced magnetic field versus electrical conductivity. Referring to FIG. 9, when the electrical conductivity of copper (Cu) is 1×, the strength of the induced magnetic field decreases with the electrical conductivity of the conductive structure 15 (from 0.5× to 0.1×).

Figure 10:
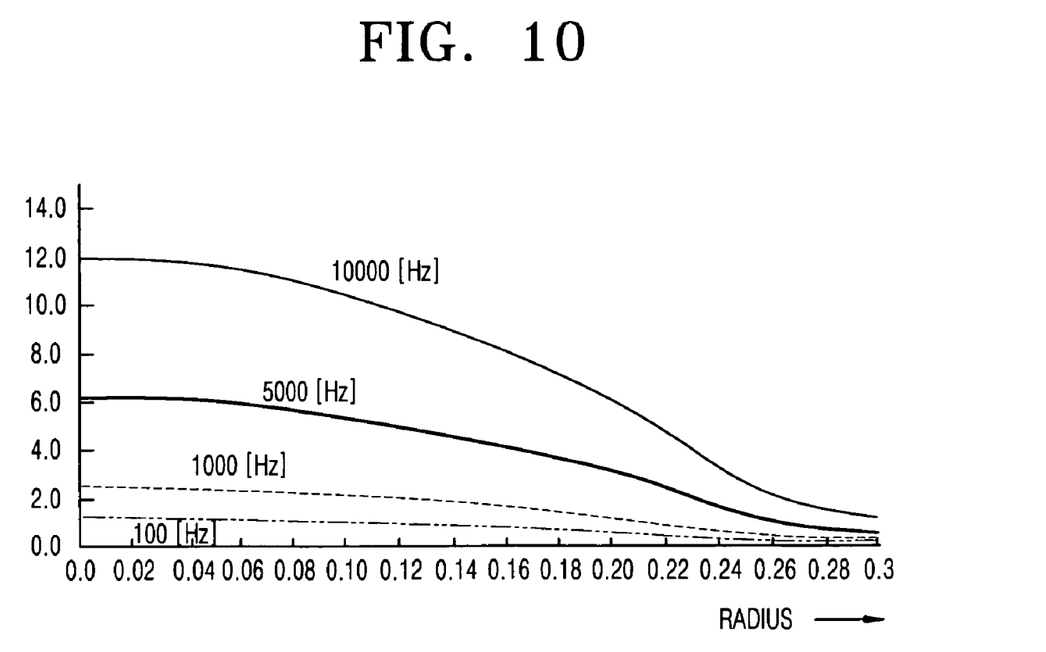
FIG. 10 is a graph illustrating strength of the induced magnetic field versus frequency of an AC voltage applied to the magnetic field generator.

FIG. 10 is a graph illustrating the strength of the induced magnetic field versus the frequency of the AC voltage applied to the magnetic field generator 12. Referring to FIG. 10, when the frequency of the AC voltage increases from 100 Hz to 1000 Hz, the strength of the magnetic field induced from the conductive structure 15 also increases dramatically. This can be expected from the fact that the induced magnetic field from the conductive structure 15 is proportional to variation in the magnetic field around the conductive structure 15, as described above.

Therefore, the resolution of the temperature measuring apparatus according to the present invention increases in proportion to the number of turns of the conductive structure 15, the electrical conductivity of the conductive structure 15, and the frequency of an AC voltage applied to the magnetic field generator 12.

Figure 11A:
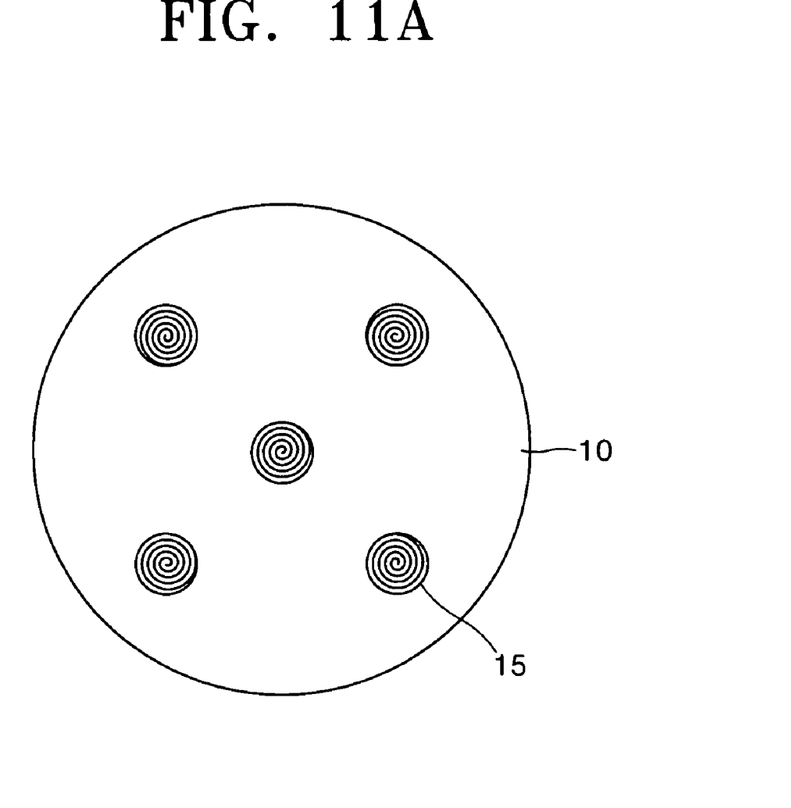
FIGS. 11A and 11B are views illustrating a structure of the temperature measuring apparatus having a plurality of conductive structures.
Figure 11B:
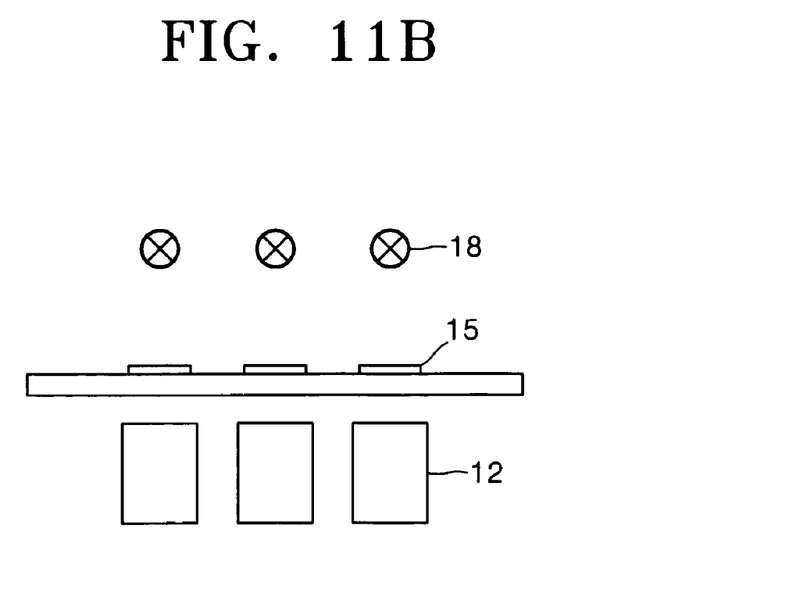

FIGS. 11A and 11B are a plan view and a side view, respectively, illustrating a structure of the temperature measuring apparatus having a plurality of conductive structures 15. Temperatures must be measured at several areas of the wafer 10 so as to correctly measure temperature variation of the wafer 10 on which the thermal process is performed within the thermal processing system such as a bake system. Therefore, as shown in FIG. 11A, a plurality of conductive structures 15 are uniformly installed on the wafer 10 and temperatures are measured at the respective regions of the wafer 10. At this point, in order not to damage the semiconductor chips (or structures) stacked on the wafer, it may be preferable to install the conductive structures 15 at empty regions where semiconductor chips are not formed.

Referring to FIG. 11B, a plurality of magnetic field generators 12 and a plurality of magnetic field measuring sensors 18 are arranged at positions corresponding to the respective conductive structures 15. Then, a varying magnetic field is applied to the respective conductive structures 15, and the magnetic field measuring sensors 18 measure the strengths of the induced magnetic fields generated from the conductive structures 15. Here, an interference phenomenon may occur due to the magnetic fields generated from the magnetic field generators 12. Such interference may cause error in the temperature measurement. Therefore, it may be preferable to apply the AC voltage to the magnetic field generators 12 in turn. For example, while the AC voltage is applied to the first magnetic field generator, the other magnetic field generators are turned off. After a predetermined time, the AC voltage is applied to the second magnetic field generator, and the other magnetic field generators are turned off. The length of time for which the AC voltage is applied to each of the magnetic field generators can be appropriately determined depending on the frequency. For example, when the frequency is 100 Hz, the voltage must be applied to each magnetic field generator for at least ¹⁄₁₀₀ of a second.

Figure 12:
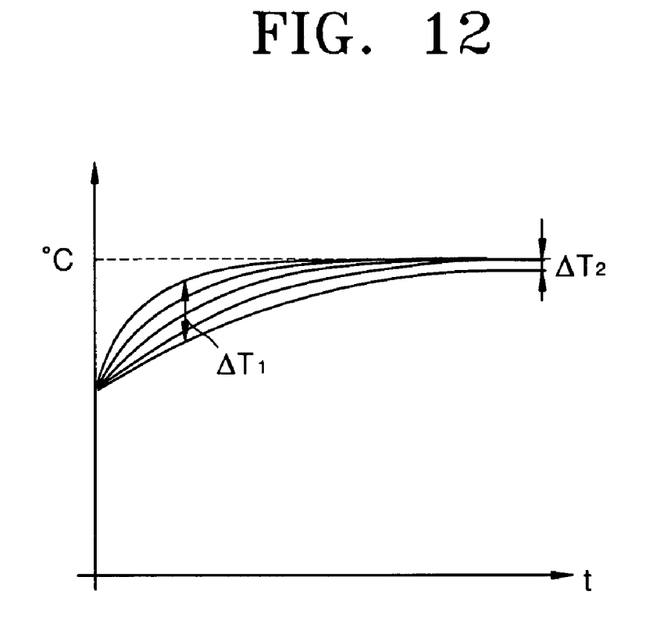
FIG. 12 is a graph illustrating an example of temperature variation of the wafer, which is measured by the temperature measuring apparatus according to an exemplary embodiment of the present invention.

FIG. 12 is a graph illustrating an example of temperature variation of the wafer, which is measured by the temperature measuring apparatus shown in FIGS. 11A and 11B. Just before the wafer 10 is heated, the entire surface of the wafer 10 is thermal equilibrium with the surrounding atmosphere. When the wafer 10 is heated on the hot plate of the bake system, the surface temperature of the wafer 10 increases slowly. Since the rate of increase of the surface temperature of the wafer 10 depends on the states of the hot plate and the wafer 10, a temperature variation $\Delta T_1$ may occur during the thermal process. Also, a temperature variation $\Delta T_2$ may occur after the thermal process is completed. The temperature measuring apparatus according to an exemplary embodiment of the present invention can measure these temperature variations in real time through the magnetic field generators 12, the conductive structures 15, and the magnetic field measuring sensors 18. Thus, when the temperature variation ($\Delta T_1$ or $\Delta T_2$) is more than 0.1° C., it can be immediately inferred that a problem occurred during the thermal process.

Figure 14:
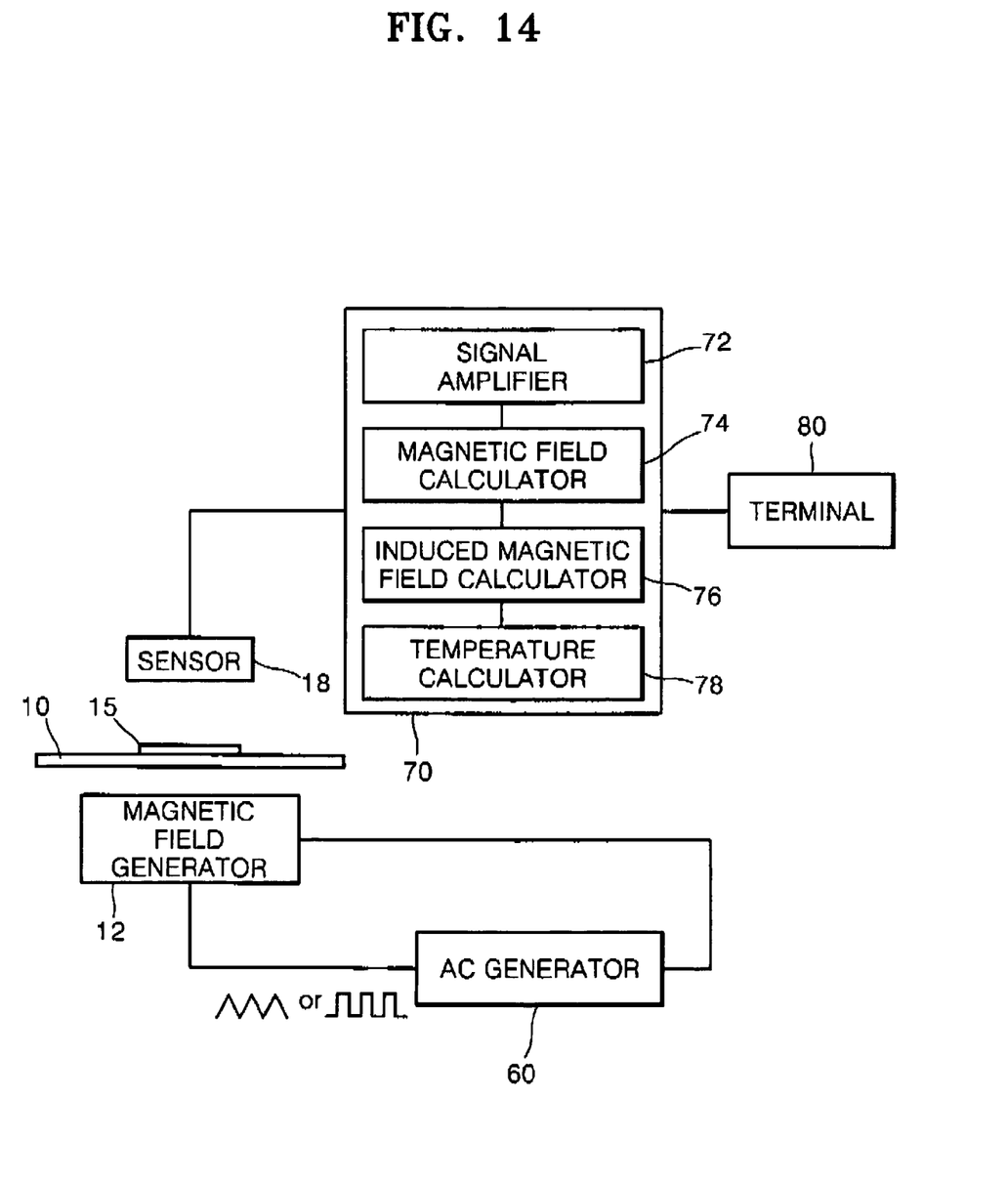
FIG. 14 is a view illustrating a construction of the temperature measuring apparatus according to an exemplary embodiment of the present invention.

FIG. 14 is a view illustrating a construction of the temperature measuring apparatus according to an exemplary embodiment of the present invention. Referring to FIG. 14, an AC generator (or AC power source) 60 supplies an AC voltage to the magnetic field generator 12. A user can properly adjust characteristics (frequency, waveform, amplitude, etc.) of the AC voltage. Also, when a plurality of magnetic field generators 12 are present, the AC generator 60 can apply the voltage to the magnetic field generators 12 in turns. In this manner, each the magnetic field generator 12 generates a magnetic field in turn. The strength of the magnetic field generated by the magnetic field generator 12 decreases due to the conductive structure 15, and the magnetic field measuring sensor 18 measures the strength of the magnetic field.

The magnetic field measuring sensor 18 generates signals according to the magnitude of the magnetic field and the signals are transferred to a signal processor 70. The signal processor 70 calculates the temperature from the strength of the magnetic field measured by the magnetic field measuring sensor 18. In more detail, the signal processor 70 includes a signal amplifier 72, a magnetic field calculator 74, an induced magnetic field calculator 76, and a temperature calculator 78. The signal amplifier 72 amplifies the signal input from the magnetic field measuring sensor 18, and the magnetic field calculator 74 calculates the strength of the magnetic field from the amplified signal. The induced magnetic field calculator 76 calculates the strength of the magnetic field induced from the conductive structure 15 by comparing the strength of the magnetic field generated by the magnetic field generator 12 with the strength of the magnetic field calculated by the magnetic field calculator 74. The temperature calculator 78 calculates the temperature of the wafer 10 from the calculated magnitude of the induced magnetic field. Here, the strength of the magnetic field generated by the magnetic field generator 12 can be known from the AC voltage applied to the magnetic field generator 12. Meanwhile, the temperature calculator 78 can store previously measured data about the relation between the magnitude of the induced magnetic field and the temperature of the wafer 10 in a lookup table of a memory (not shown). In this case, without any additional calculation, the temperature calculator 78 can retrieve the lookup table and rapidly calculate the temperature of the wafer 10 from the strength of the induced magnetic field.

The data about the temperature of the wafer 10 is transferred to the terminal 80 and displayed so that the user can conveniently view it. For example, the temperature can be displayed in the form of the graph of FIG. 12.

Figure 13:
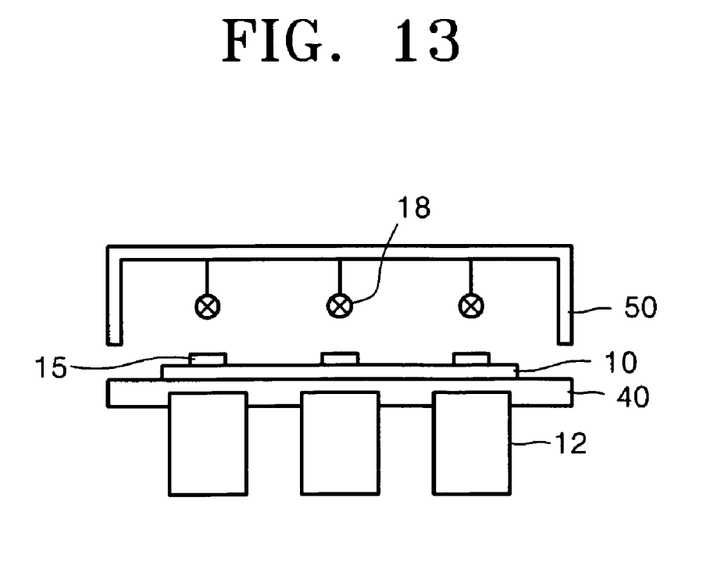
FIG. 13 is a sectional view illustrating a construction of a thermal processing system including the temperature measuring system according to an exemplary embodiment of the present invention.

FIG. 13 is a sectional view illustrating a construction of the thermal processing system including the temperature measuring system according to an exemplary embodiment of the present invention. In the thermal processing system, such as the bake system, for uniformly heating the wafer 10, the wafer 10 is placed on the hot plate 40. Hot wires for generating heat are embedded inside the hot plate 40. The plurality of magnetic field generators 12 can be installed in the hot plate 40. In another exemplary embodiment, a plurality of magnetic field generators 12 can be installed below the hot plate 40. It may be preferable to use a material that does not influence the magnetic field.

Meanwhile, as is shown in FIG. 13, the magnetic field measuring sensor 18 for measuring the strength of the magnetic field can be installed on a cover 50 covering the hot plate. The cover 50 seals the interior so that the wafer 10 cannot be influenced by the outside environment. The magnetic field measuring sensor 18 can protrude downward from an inner surface of the cover 50, facing the conductive structure 15. In this manner, the temperature measuring apparatus according to the present invention can be appropriately applied to the wafer thermal processing system.

According to the present invention, instead of temperature sensors, a device capable of generating an induced magnetic field is attached to the object to be measured, thereby solving the problem of attaching the temperature sensors in full contact with the wafer. Also, change in the temperature of the wafer with respect to time can be measured in real time during the thermal process. Unlike the conventional non-contact temperature measuring method, the temperature can be correctly measured regardless of the surface state of the object to be measured. That is, while in the conventional non-contact temperature measuring method using infrared sensors, it is necessary to accurately know the effective emissivity of the object to be measured, no such knowledge is required in the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A temperature measuring apparatus for measuring a temperature of a wafer during a thermal process, the temperature measuring apparatus comprising:

at least one conductive structure which is disposed on a surface of the wafer, an electrical conductivity of the conductive structure varying with temperature changes;

a magnetic field generator which is installed facing the conductive structure at a position which is located at a predetermined distance from the wafer and corresponds to a center of the wafer; and a magnetic field measuring sensor which is installed at a position located at a predetermined distance from the conductive structure, the magnetic field generator and the magnetic field measuring device being installed on opposite sides of the wafer.

2. The temperature measuring apparatus of claim 1, further comprising:

an AC power source which supplies an AC voltage to the magnetic field generator;

a signal processor which calculates a temperature of the wafer based on a strength of the magnetic field which is measured by the magnetic field measuring sensor; and a terminal which displays the temperature of the wafer calculated by the signal processor.

3. The temperature measuring apparatus of claim 2, wherein the signal processor comprises:

a signal amplifier which amplifies a signal output by the magnetic field measuring sensor;

a magnetic field calculator which calculates the strength of the magnetic field from the signal amplified by the signal amplifier;

an induced magnetic field calculator which calculates a strength of an induced magnetic field of the conductive structure by comparing a strength of a magnetic field generated by the magnetic field generator with the strength of the magnetic field calculated by the magnetic field calculator; and a temperature calculator for calculating the temperature of the wafer from the strength of the induced magnetic field calculated by the induced magnetic field calculator.

4. The temperature measuring apparatus of claim 3, wherein the temperature calculator stores in a lookup table previously measured data about a relation between the strength of the induced magnetic field and the temperature of the wafer.

5. The temperature measuring apparatus of claim 2, wherein the conductive structure comprises an induction coil which is spirally wound at least one time.

6. The temperature measuring apparatus of claim 5, wherein a plurality of conduction coils are arranged on the surface of the wafer.

7. The temperature measuring apparatus of claim 6, wherein the plurality of induction coils are arranged at empty regions on the surface of the wafer where semiconductor chips are not formed.

8. The temperature measuring apparatus of claim 7, wherein a plurality of magnetic field generators and a plurality of magnetic field sensors are installed at positions corresponding to the plurality of induction coils.

9. The temperature measuring apparatus of claim 8, wherein the AC power source supplies the AC voltage to the magnetic field generators at predetermined time intervals and in a predetermined order.

10. The temperature measuring apparatus of claim 1, wherein the magnetic field generator is an AC electromagnet driven by an AC power source.

11. A wafer thermal processing system comprising:
a hot plate which uniformly heats a wafer placed thereon;
a cover which seals the hot plate; and
a temperature measuring apparatus comprising:
at least one conductive structure which is disposed on a surface of the wafer, an electrical conductivity of the conductive structure varying with temperature changes;

a magnetic field generator which is installed facing the conductive structure at a position which is located at a predetermined distance from the wafer and corresponds to a center of the wafer; and a magnetic field measuring sensor which is installed at a position located at a predetermined distance from the conductive structure, the magnetic field generator and the magnetic field measuring device being installed on opposite sides of the wafer.

12. The wafer thermal processing system of claim 11, wherein the temperature measuring apparatus further comprises:

an AC power source which supplies an AC current to the magnetic field generator;

a signal processor which calculates a temperature of the wafer from a strength of the magnetic field which is measured by the magnetic field measuring sensor; and a terminal which displays the temperature of the wafer calculated by the signal processor.

13. The wafer thermal processing system of claim 11, wherein the conductive structure comprises an induction coil which is spirally wound at least one time.

14. The wafer thermal processing system of claim 13, wherein a plurality of conduction coils are arranged on the surface of the wafer.

15. The wafer thermal processing system of claim 14, wherein the plurality of induction coils are arranged at empty regions of the wafer where semiconductor chips are not formed.

16. The wafer thermal processing system of claim 14, wherein a plurality of magnetic field generators and a plurality of magnetic field sensors are installed at positions corresponding to the plurality of induction coil.

17. The wafer thermal processing system of claim 16, wherein the magnetic field generators are installed within the hot plate and the magnetic field measuring sensors are installed protruding downward from an inner surface of a cover.

18. The wafer thermal processing system of claim 16, wherein the AC power source supplies the AC voltage to the magnetic field generators at predetermined time intervals and in a predetermined order.

* * * * *